June 10, 1952 — L. E. THOMPSON — 2,600,341
LIQUID LEVEL GAUGE AND OPERATING SYSTEM
Filed Oct. 27, 1949 — 4 Sheets-Sheet 1
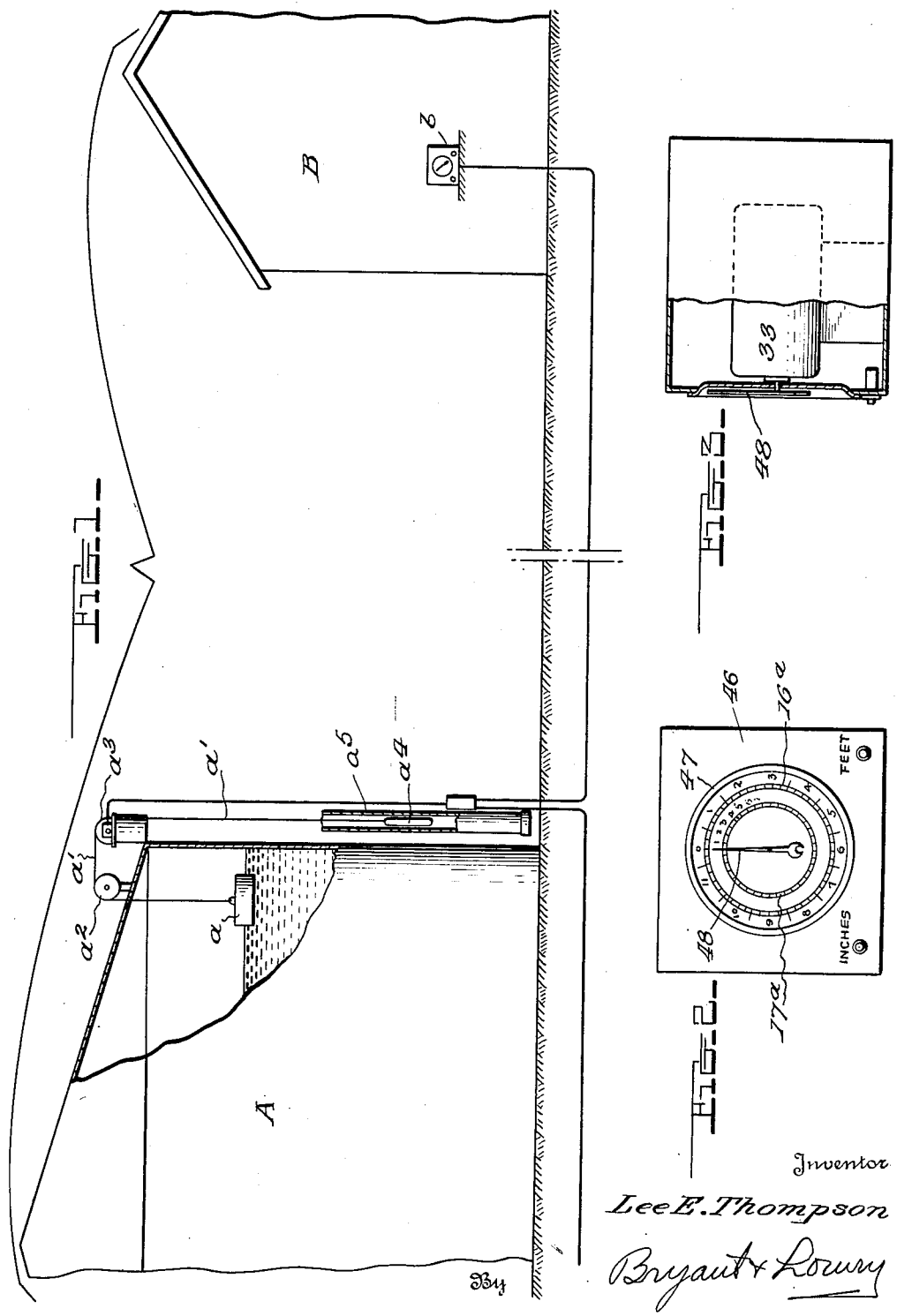
Inventor
Lee E. Thompson
By Bryant & Lowry
Attorneys June 10, 1952  L. E. THOMPSON  2,600,341
LIQUID LEVEL GAUGE AND OPERATING SYSTEM
Filed Oct. 27, 1949  4 Sheets-Sheet 2

Inventor
Lee E. Thompson
By Bryant & Lowry
Attorneys

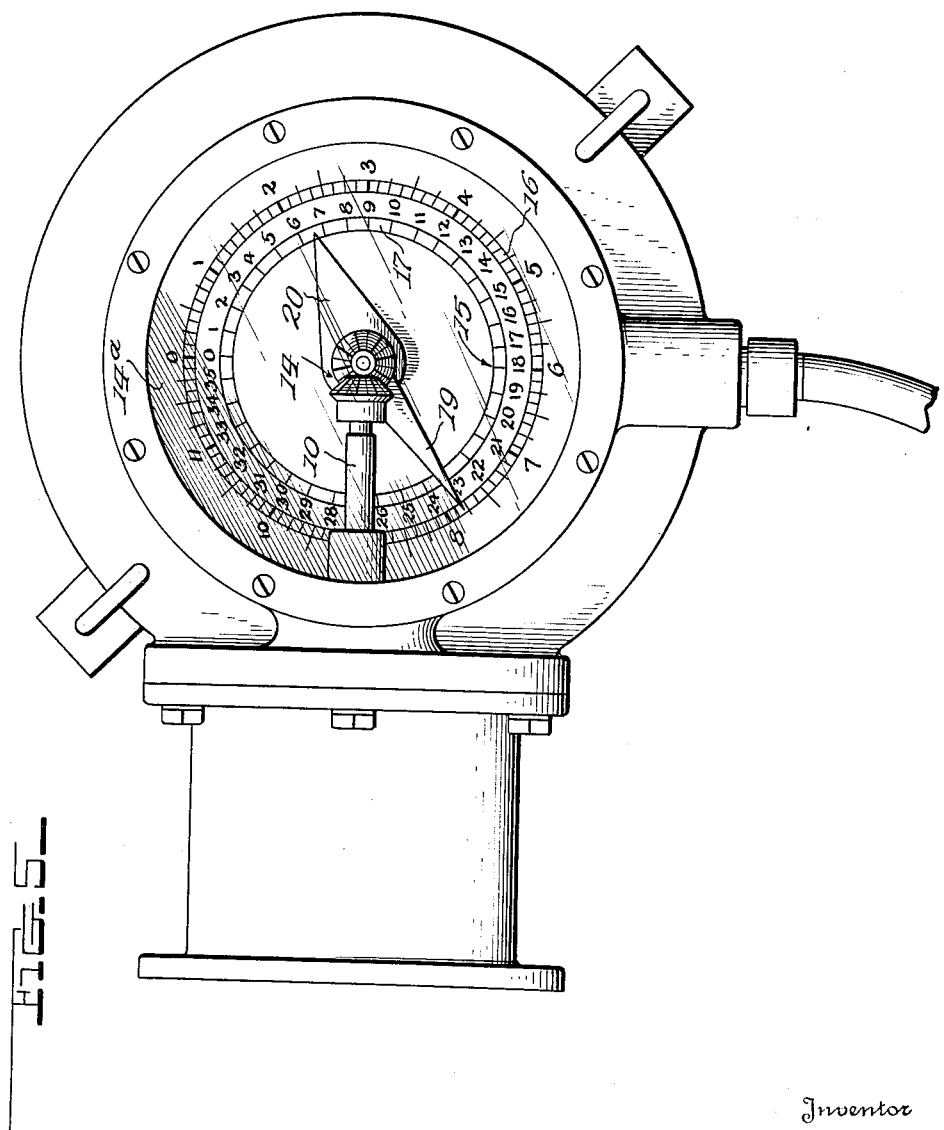

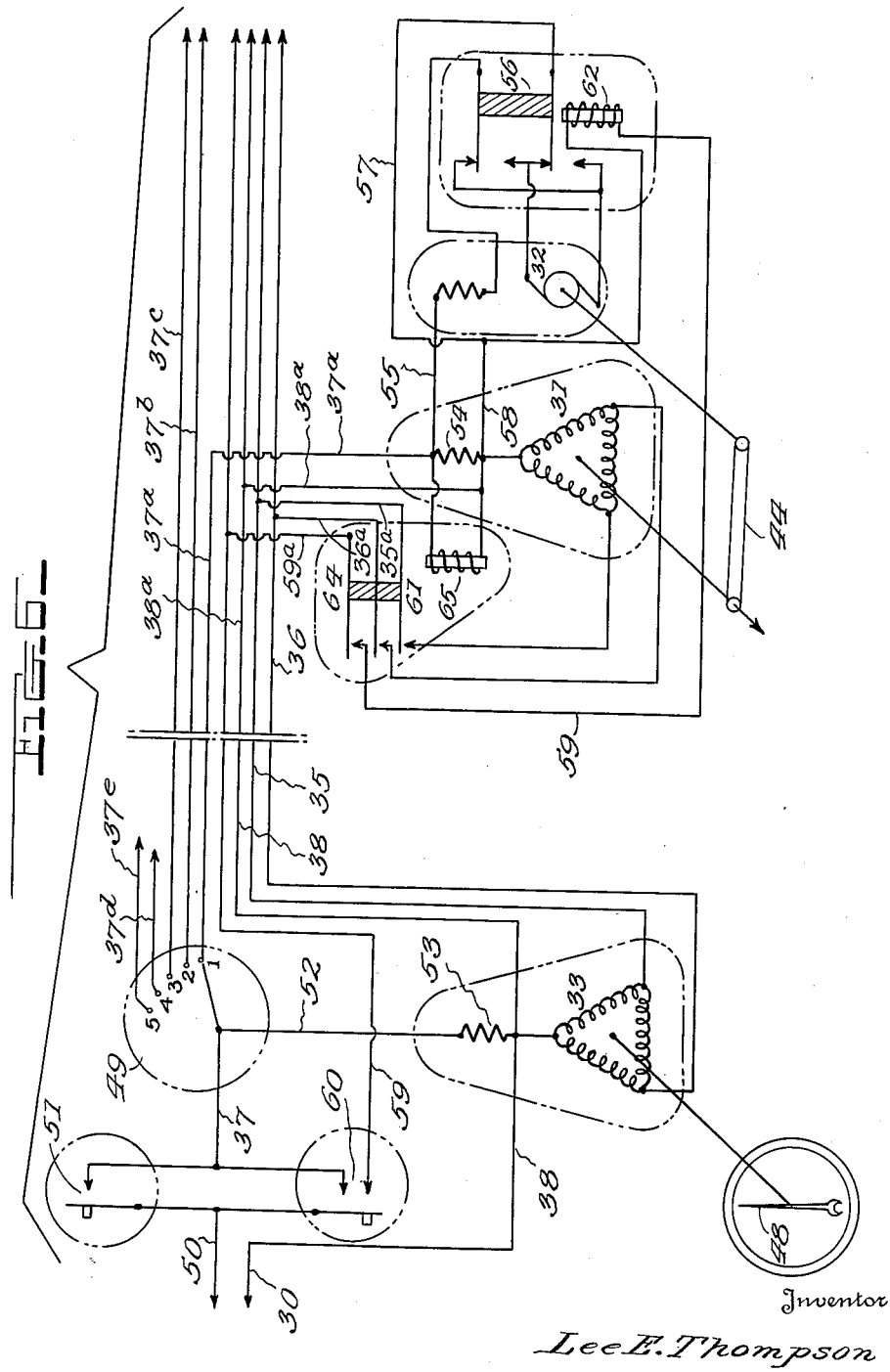

Patented June 10, 1952

2,600,341

UNITED STATES PATENT OFFICE 2,600,341

LIQUID LEVEL GAUGE AND OPERATING SYSTEM

Lee Elmer Thompson, Tulsa, Okla.

Application October 27, 1949, Serial No. 123,861

17 Claims. (Cl. 73—313)

1

This invention relates to improvements in indicating systems and has particular relation to systems designed to indicate the depth of liquid content of tanks or other containers. While the invention contemplates usage under such conditions generally, it is particularly designed for use in connection with the tanks or other containers temporarily used in storing oil, whether at the oil field or at distributing points.

Tanks used for oil storage are generally large and, as a result, have large surface areas. Since the cross-sectional dimensions are constant, if the volume per unit of depth be known, and the height of the content be measured, the total volume in gallons or other liquid measure can be computed by a simple multiplication operation.

The number of tanks in an installation at an oil field or distributing center will depend upon a number of factors, including the estimated total volume to be stored at any one time. One tank may be sufficient for a small installation but generally a number are required. Since it is not advisable to have the office or other headquarters in the immediate vicinity of a tank, to avoid the hazards of fire, and since the depth measuring mechanism must be close to the tank itself, it is necessary to obtain and deliver information as to depth values from one station to another. Such is the underlying purpose of the present invention which is arranged in such manner that it is unnecessary to leave the office station to ascertain the depth value at the tank. This result is obtained by establishing a transmitting station at the tank and a receiving station at the office, operatively connecting the two stations so that depth information developed at the former is transmitted to the latter, all operating controls for both units being at the receiving station. Where a plurality of tanks are present in the installation, each is equipped with transmitting station equipment, and the operative connections therefrom lead to the single receiving station, permitting the transfer of the information from the transmitting stations individually.

A system of this type involves the solving of a number of problems, a few of which will be referred to. For instance, because the dimensions of a tank are large, variations in depth of fractions of an inch can produce material variations in the volume present, so that if reasonable accuracy is to be had in ascertaining the volume present, it is essential that the indications be supplied on the basis of such small fraction

2 values. To provide readable indications of this type on a single scale would require apparatus of prohibitive proportions. The problem was solved by the use of two concentric scales, the outer scale based on inches totalling a foot, and the inner scale based on feet. Individual indicating hands, axially alined, are used for the two scales at the transmitting station, with these operatively connected through reduction gearing, a single indicating hand being used at the receiving station. The two stations are connected by a selsyn assembly capable of rotating in either direction of rotation, with the unit at the transmitting station arranged to first indicate the position of the feet indicating hand and then the position of the inch indicating hand, these being successively transmitted to the single indicating hand at the receiving station to permit notation of the several positions, the notations thus presenting a duplication of the positions of the indicating hands of the transmitting station at the testing time.

Another problem exists where a plurality of tanks are present with depth values required in each of them. This was solved by equipping each tank with individual transmitting equipment, including the transmitting unit of the selsyn assembly, and providing controllable connections from such individual units to the selsyn assembly unit at the central receiving station, permitting each tank to be individually tested for depth of content.

Another problem exists where a plurality of in which the positions of the indicating hands of the transmitting station at the testing moment are to be transmitted to the indicating hand at the receiving station through the selsyn assembly, since the hands at the transmitting station are constantly active and assumedly changing positions as the surface level of the tank rises and falls, while the selsyn assembly and the indicating hand at the receiving station are active only during the testing period. This was solved by equipping the constantly active indicating unit of the transmitting station with a pair of arms, each carrying a finger and rotated in unison with the indicating hands, thus duplicating the movements and positions of the indicating hands in proximity to the transmitting unit of the selsyn assembly, and supplying the latter unit with a tiltable vane rotatable with the unit and arranging the vane so that during one direction of rotation of the selsyn unit and its motor, one end of the vane will be elevated into a position where it will contact the "feet" arm during rotation, after which the motor and selsyn assembly is reversed in direction of rotation to cause the vane to tilt to raise its other end into position to contact the "inch" arm finger during the reversed movement. Since contact of the vane with either arm finger produces stoppage in the advance of the selsyn unit at the transmitting station, with the receiving unit operating in synchronism therewith, the indicating hand of the receiving station is first moved to the position relative to the foot scale that is present at the moment of contact. This position is noted and the selsyn assembly reversed in direction of rotation to cause the vane also to move in the opposite direction, tilting the vane and bringing the opposite end into contact with the "inch" arm, to stop further rotation. The indicating hand at the receiving station, which moves in unison with the selsyn asembly, is thus brought to a stop in the "inch" direction, thus giving the position of the inch hand. This is noted and its position on the inch scale indicates the inch addition which may be present above the feet values at time of testing, the two notations giving the total depth of tank content.

Other problems are present, but the above are those of greater importance, the solution of which enables the development of a system of this type and purpose that is simple and efficient in structure and operation, durable in construction, and which is of comparatively low cost.

With the above and other objects in view, as will be presently apparent, the invention consists in general of certain novel details of construction and combinations of parts hereinafter fully described, illustrated in the accompanying drawings and particularly claimed.

In the accompanying drawings like characters of reference indicate like parts in the several views, and Figure 1 is a schematic view, partly in side elevation and partly in section, illustrating a tank and its float equipment which cooperates with the structures of the assemblage which form the transmitting station, the view also showing the exterior of the receiving station with its receiving indicator;

Figure 2 is a face view of the receiving indicator;

Figure 3 is a side elevation, partly broken away, of the receiving indicator casing, with parts shown in section;

Figure 5 is a top plan view of the top of the structure shown in Figure 4;

Figure 6 is a diagrammatic view showing the various portions of the selsyn assembly, shown diagrammatically, together with the wiring connecting the units of the assembly together with their controls.

Referring first to Figure 1, A indicates a tank for liquid content which, for purposes of disclosure of the invention, is assumed to be an oil tank located in an oil field or at a distributing station, and thus frequently subject to variations in volume of content. Since it is desirable to ascertain the current volume in the tank at frequent intervals, the practice has developed of employing a float mechanism by which to ascertain the current surface level in terms of depth and to transmit this knowledge to an indicator from which it is possible to ascertain the volume of content by a simple form of mathematics. Such float mechanism is indicated in Figure 1 by a float $a$ attached to a line $a'$ carried upwardly through the top of the tank, over a pair of pulleys $a^2$ and $a^3$, and then downward outside the tank to a weight $a^4$ mounted in a casing $a^5$ adjacent the tank. The weight keeps the line taut as the float rises and falls, and the line movement over pulley $a^3$ can be used to operate an indicator mechanism of suitable type through the rotatory movements of pulley $a^3$. The specific form of float mechanism employed is not considered within the present invention, but the rotatory movements of pulley $a^3$ are vitally important within the invention, since these represent the current position of the surface level together with the rise and fall movements of the float as the content is being varied, the position of the float giving the current depth value of the tank content.

Various forms of apparatus have heretofore been contemplated for making information as to current depth available, generally in the form of indicating structures, and, in some cases, this has been carried to a remote point, such as an office or the like, this being done to reduce fire hazard possibilities. In some respects, the present invention is of the latter type, such an indicating point being shown at $b$ in connection with the building B, shown in Figure 1. Actually, the present invention is found in the assemblages intermediate pulley $a^3$ and indicating mechanism $b$, except that the indicator face at $b$ is also included within the invention, the invention being designed to indicate the current position of float $a$ of the tank on indicator $b$ at will, with pulley $a^3$ providing the active element for indicating the position of the float.

Figure 4:
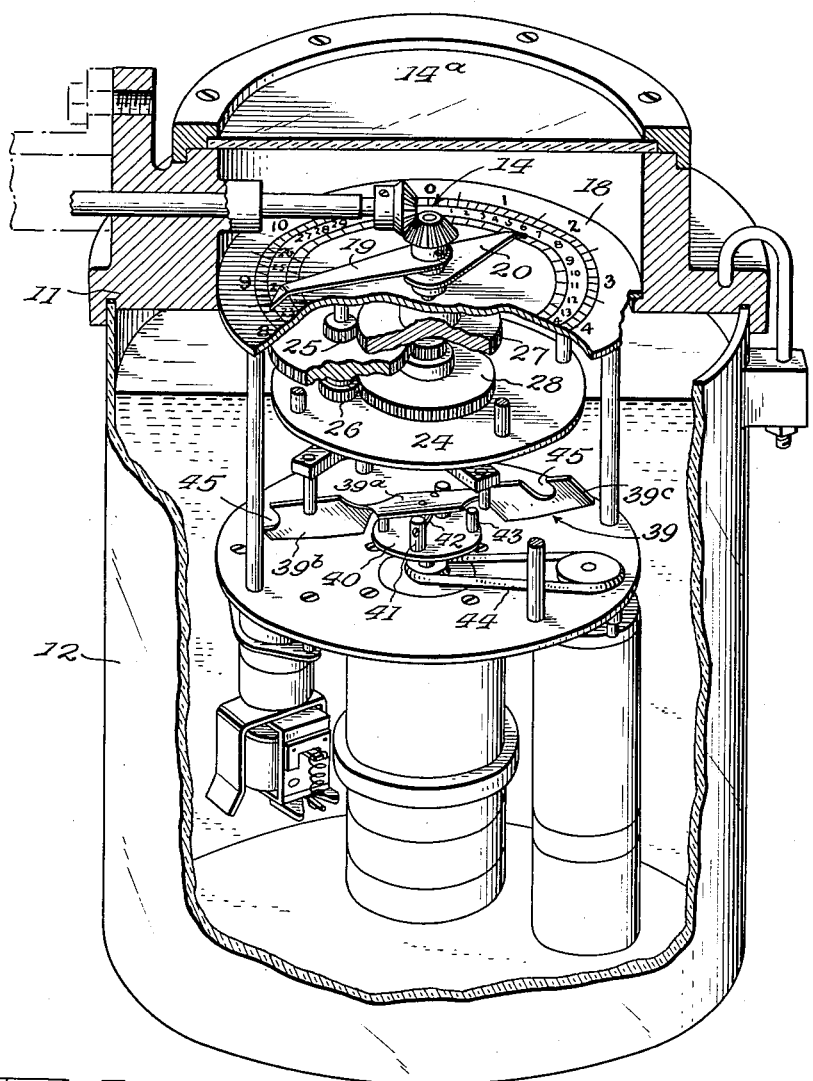
Figure 4 is a perspective view, with parts broken away, showing elements comprised within the transmitting station.

The initial activity of the invention is provided at the transmission station, in the form of a shaft 10 which is carried by a casing 11, which shaft carries pulley $a^3$ and partakes of the movement of the pulley (Figures 4, 5 and 7), casing 11 forming an external housing for the shaft and forming the upper section of the casing or housing 12 for the transmitting mechanism of the station, and which is of circular contour with a bottom and formed of material suitable for containing oil within which the transmitting mechanism is located (Figure 4). Shaft 10 extends in the direction of the axis of casing 11, 12, with its inner end approaching such axis, being operatively connected with a vertical downwardly extending shaft 13 located in such axis, with the connection in the form of bevel gearing 14 having a 1:1 ratio, the shafts 10 and 13 thus having their rotating movements in unison and at equal speeds. The upper end of shaft 13 lies below and spaced from the top plane of casing 11 to thereby permit of the formation of an indication chamber, the top of which is closed by a glass covering plate 14a to permit ready inspection of the indications at will.

As above noted, the indicating scale arrangement is in the form of two concentric circles, the outer one indicating inches and the inner indicating feet, this arrangement permitting the inch calibrations to reach small values and retain readability. A scale sheet of this type is shown at 15 (Figures 4 and 5) with the inch scale indicated at 16, and the feet scale at 17. Sheet 15 is carried by a horizontal partition 18 parallel with the top and spaced below pinions 14 and forms the bottom of a chamber which houses the indicating hand 19 (for the inch scale) and 20 (for the feet scale), shaft 13 extending through the axis of partition 18. Indicator hand 19 is rigidly secured to shaft 13 above the vertical position of hand 20, and therefore partakes of all the rotary movement of shafts 10 and 13, and has its free end co-operative with scale 16.

The inch scale 16 is arbitrarily calibrated into twelve equal zones with each zone representing the travel of float $a$ through a distance of one inch, the calibrations within the zones representing fractions of an inch in such travel. Hence, one complete revolution of shafts 10 and 13, will represent the travel of the float through a distance of one foot in the depth of tank content.

The "feet" scale 17, of smaller diameter than the inch scale, is, however, calibrated on the basis of the maximum depth of content held in the tank. It may be greater than such designed depth, but not less, the actual calibration depending somewhat on the ratio of gearing presently described and which is required for the proper operation of the feet hand. For purposes of illustration, the drawings have indicated a maximum content depth of 36 feet with the gear ratio as 36:1, the scale 17 thus being calibrated into thirty-six zones, the gearing being designed to move hand 20 a distance of one zone for each complete revolution of shafts 10 and 13. The zones are necessarily short in length, making subdivision thereof difficult, but since, in practice, this scale is not used to indicate distances smaller than a foot, subdividing may be omitted.

Figure 7:
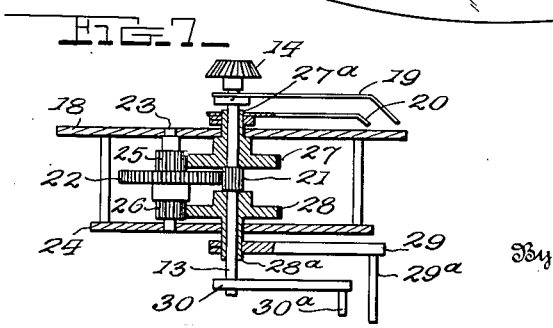
Figure 7 is a fragmentary detail, partly in elevation and partly in section, of the constantly active elements at the transmitting station.

A preferred form of gearing used in moving hand 20 is shown in Figure 7, it being assumed that the ratio is 36:1, as above referred to. Carried by shaft 13 to move therewith in the midzone of the shaft length is a pinion 21, meshing with a gear 22 carried by a stub shaft 23 extending vertically and parallel to shaft 13, shaft 23 being supported by partition 18 and a plate 24 extending in spaced relation and parallel with such partition, the partition and plate tending to isolate the gearing. Shaft 23 additionally carries a pair of pinions 25, 26, the former located above and the latter below gear 22. These pinions mesh with a pair of gears 27 and 28 respectively, these each having an outwardly extending bushing or sleeve extension, indicated at 27a and 28a respectively, the gears and bushings being mounted on shaft 13 for free rotation thereon, with the bushings respectively extending through partitions 18 and plate 24. Bushing 27a carries feet hand 20 located below inch hand 19, while bushing 28a carries an arm 29, presently described, below plate 24. At the gear ratio of 36:1, a suitable arrangement would have pinions 21, 25 and 26 as formed with 12 teeth, while gears 22, 27 and 28 would have 72 teeth. As will be apparent, such arrangement would cause hand 19 to traverse the complete range of circular scale 16 during one complete revolution of shaft 13, while hand 20 would traverse one of the zones of scale 15 during the same period, any rotative movement of shaft 13 being effective upon both hands. Hence hand 20 serves to indicate the number of revolutions of hand 19, but inasmuch as one revolution of hand 19 is equal to the rise or fall of float $a$ a distance of one foot, hand 20 serves also to indicate the movement in either direction of the float in terms of feet.

29 indicates a laterally-extending arm carried by bushing 28a, said arm carrying a depending finger 29a in its free end zone, the arm being adjustably secured to the bushing to move therewith. The lower end of shaft 13 carries a similar arm 30, with depending finger 30a, arm 30 being of less length than arm 29, the two arms and fingers thus traversing different paths, the inch arm being below and of less length than the foot arm, thus reversing the relation of the lengths of hands 19 and 20. However, it is preferred that the paths of travel of the lower ends of the two arm fingers extend to a common horizontal plane so that finger 30a is shorter than finger 29a, the paths of travel of the two fingers being spaced apart a material distance. In mounting the arms, arm 29 and hand 20 have substantially the same angular setting, and arm 30 and hand 19 have a similar relation. In practice, for reasons to be explained, the angular setting of arm 29 places one side of its finger 29a as having the same angular position of hand 20, the positioning of arm 30 placing the opposite side of its finger 30a in the same angular position as the point of hand 19. As a result and due to gearing connections, the active faces of the fingers will always have the same angular relation to each other as is presented by the pointed ends of hands 19 and 20, a condition of fundamental importance in the present invention in producing the indications at the receiving station, as presently explained.

The readings presented by the indicator shown in Figure 5 may be transmitted to an indicator at the receiving station at any desired testing time by activating the transmitting mechanisms of the present invention. The major structures of such transmitting mechanism is in the form of a selsyn assembly, the details of which are not disclosed in the drawings since it is of a slightly modified form of known assemblies of this type. It is shown diagrammatically in Figure 6 in which a selsyn unit 31 is located at the transmission station and designed to be rendered active by operation of a motor 32 at such station, a second selsyn unit 33 being located at the receiving station, these units being connected by the three-phase wiring connections that are employed in such assemblies, indicated by lines 38a, 35 and 36, together with lines 37 and 38 which connect the assembly to the power line.

In practice, the two units rotate in exact synchronism when active, and start and stop simultaneously, with the rotation in either direction, these conditions being fundamental in assemblies of this type. In the present invention various control units are shown, some of well-known type and shown only diagrammatically, while others are specific to the present invention and are shown more or less in detail in the remaining figures of the drawings. At this point it is sufficient to indicate that at the time of test, line 37 is made active to begin motor operation in one direction, this operating the selsyn unit at the transmitting station with the concurrent movemen at the receiving station, this movement of the units in this direction continuing until the position of the feet hand is reached, whereupon the unit at the transmitting station is automatically stopped, thereby stopping the unit at the receiving station and indicating the position of foot hand 20 at said receiving station. The controls are then operated to cause rotation of the motor in the opposite direction, thus causing a similar reversal in the selsyn units, the rotation being continued until the position of hand 19 is reached which automatically stops the units and indicates the position of hand 19 at the receiving station. These noted positions will then give the readings present at the transmitting station at time of test.

To provide this operation, a number of specific features are used and will now be described:

While the starting of the rotations of the selsyn units is by manual control which controls the start and stop of the motor, the stopping of the selsyn units is controlled by fingers 29a and 30a, as described, so that accurate timing may be had. This control is provided through the use of a vane 39 (Figure 4) mounted for rotation by and with selsyn unit 31. As indicated in this figure, the casing 12 is nearly filled with oil so that the vane has its movements in such oil. The vane includes a central zone 39a and a pair of end zones 39b and 39c, and is supported in its central zone by a plate 40 carried by and rotatable with the shaft of unit 31, said plate having a pair of spaced posts 41 mounted on a diameter of the plate, the posts carrying an axle 42 to which the central zone of the vane is secured. The end zones 39b and 39c radiate in opposite directions from the central zone normal to the direction of length of the axle 42, these end zones having approximately similar lengths but having their width extending angularly to the plane of the central zone and that of plate 40. The end zones are secured to the middle zone by bending the vane, so that the width of an end zone presents its faces as inclined to the plane of plate 40, the important feature being that the zones are inclined toward the same side of the vane, the inclinations being from the same edge of the zones. In other words, instead of the inclinations extending in reverse directions on opposite sides of the axis of rotation, they extend in the same direction, the result being that when the vane is rotating in one direction the leading edge of one zone will be the upper edge of the zone while the leading edge of the opposite end zone will be the lower edge of the zone. Consequently, while rotating in one direction, the end zone having the upper edge as leading will be forced upwardly since the zone advance places the under face of the zone as the leading face, while the other zone will be forced downwardly, since its leading face is the upper face of the zone, the result being that the vane is rocked pivotally on axle 42 to raise one end of the vane and lower the other end. When the direction of rotation is reversed, the direction of rocking is also reversed and the zone which had been previously raised is now lowered and the other zone raised. To limit the extent of rocking movement, plate 40 carries upstanding stop pins 43 on opposite sides of and spaced from axle 42, these limiting the downward movement of the zone travelling downward. The rocking movement is due to the fact that the inclined end zones are advancing through the oil content contained in casing 12.

In practice, an end zone when in its upper position will have its travel path intersecting the length of fingers 29a and 30a, while the lower end zone is below the ends of such fingers. Hence, the upper end zone will engage a finger, and since the entire gearing above described is operatively engaged and provides a high resistance factor to any rotation of the arm carrying the engaged finger, this resistance opposes further advance of the vane in such direction, thus resisting advance of the selsyn unit. This unit is driven from the motor by a drive element 44 in the form of a spring belt, so that the friction drive is of less value than the resistance with the result that the unit will instantly stop its advance without affecting the motor. The stoppage of this unit, because of the selsyn characteristics, instantly stops the unit at the receiving station.

The opposite end zones of the vane are designed to be individual to the fingers. To produce this result the two fingers 29a and 30a are located different distances from the axis of shaft 13, and the end zones of the vane are so arranged, through the configurations of the zone, that when one end zone is raised, it will engage one of the fingers through contact of its leading face, the zone having a recess 45 positioned at a point such as to permit the other finger to pass freely through the recess when its position is reached by the advancing vane. At such time the other end zone is in its lower position. When the direction of motion is reversed and the latter end zone is raised to its upper position, it will engage the other finger and not be affected by the first finger, due to the presence of recess 45. Hence, in each direction of rotation, one of the fingers will stop rotation of the selsyn unit, said finger being controlled by the direction of rotation which serves to selectively raise one of the end zones to a position where it will engage a finger.

The indicating assembly at the receiving station, indicated at b in Figure 1 and shown more particularly in Figures 2 and 3, presents an indicating card 46 on its face, said card having a scale marking 47 which substantially duplicates the showing of the card 15 at the transmitting station, having the outer "inch" scale 16a and inner "feet" scale 17a arranged concentrically to a common axis which forms the axis of rotation for an indicator hand 48 arranged to cooperate with both scales. Within the casing which carries such indicating assembly is mounted the selsyn unit 33, the shaft of which provides the mounting for hand 48. A single indicating hand is used at this station, this hand moving with the shaft of unit 33 during rotation of the latter. When the selsyn assembly has its movement in the direction of rotation to indicate the position of hand 20, the vane is brought to its contact with finger 29a, thus stopping the selsyn advance in this direction. Since unit 33 is also advancing hand 48 in the same direction, the stoppage of the unit positions the hand 48 at the proper point on scale 17a, the hand then having the angularity present with hand 20. After noting the position of hand 48 on scale 17a, the direction of rotation of motor 32 is reversed, reversing the direction of rotation of the selsyn units and vane 39, made possible by the movement of the vane away from its contact with finger 29a due to the reversal.

This change in direction of movement of the vane produces a number of changed conditions. With the change in direction of movement the end zones of the vane become active to tilt the vane, as heretofore described, thus raising the end zone which co-operates with finger 30a, and lowering the opposite end zone to be non-cooperative with finger 29a. Should the position of finger 30a be such that the vane has not travelled a sufficient distance to raise the proper vane end zone into contacting range with the finger, the selsyn units and vane continue to rotate until the vane again reaches the position of contact. Since this would involve a complete rotation of the vane about the selsyn unit axis, ample time and length of movement will have been provided to complete the raising of such end zone, placing the zone in position to stop the selsyn advance upon completion of the contact of such end zone with finger 30a.

The matter of the length of movement of the selsyn units prior to stoppage does not affect the indicating action, due to the fact that while the vane is carried by one unit while hand 48 is carried by the other unit, both vane and hand move rotatively in unison with the units, so that the hand will have the same angularity to a given point as is present with the vane. As a result, stoppage of the vane by a finger will leave hand 48 at the same angle as is present with the vane, so that the hand will be presenting the same angle as the hand 19 or 20 bears to its scale depending upon which indication is being transmitted. Hence, when contact between the end zone and finger 30a is had, with stoppage of the units, and a second notation then made as to position of hand 48 on scale 16a, the two notations will accurately present the reading of the positions of hands 19 and 20 at the time of test, the first notation giving depth in feet and the second notation giving the additional depth in inches and fractions of an inch. The two notations will also present the angularity present between hands 19 and 20 at the time of test.

Due to the dual service placed on hand 48 to indicate the positions of both hands 19 and 20, it is possible to transmit the positions by the use of a single selsyn system, by following the regimen indicated above and through the activities of the vane and the fingers 29a and 30a all mounted in the manner pointed out. The only co-action between these is a contact between a vane end zone and a finger to stop the selsyn movements, and forms the connecting link operatively between the constantly active portion of the assemblage which is indicating the current depth of tank content and that portion of the assemblage which gives at will the current readings to a remote station automatically during the test.

As will be understood from Figures 1 and 7, the gearing section at the transmitting station is active constantly since it is subject to the movements of float a made active on the gear mechanism through the movements of pulley $a^3$ and shaft 10. Hence, as the float rises and falls with movement of oil into and out of the tank A, shaft 13 will be moved rotatively whenever the position of the float changes. Shaft 13 being in 1:1 ratio with shaft 10, the inch hand 19 and inch arm 30 will be directly driven in either direction in synchronism with the movement of the float, while the foot hand 20 and foot arm 29 will be driven in either direction through the gear reduction assembly operated by pinion 21 on shaft 13, all of these structures being movable responsive to the movements of float a whether it rises or falls with the surface level of oil in the tank. Hence, the hands 19 and 20 indicate current depth of oil, these indications changing with float movements. Both hands and both arms move with each change so that hands 19 and 20 indicate only the values present during a reading period; no accumulative record of such content is made.

On the other hand, the remaining elements are operative at will, vane 39 moving to a balanced position when the elements are inactive for a material period since movement out of such position to tilted position takes place only while the vane is moving in either direction. When balanced, the vane is out of the path of movement of fingers 29a and 30a so that arms 29 and 30 and their fingers are free to move during all changes in position of float a. Thus, at time of test, the readings are those of current depth values of oil content of the tank.

The means employed for providing the controlled movements of the structures operating at will are shown diagrammatically in Figure 6. Some of the means are described in detail above, the drawings indicating the general structure of these. Other structures, such as make and break structures, relays and other forms of control units are generally of well-known types, being sufficiently understood from such diagrammatic showing which will now be generally described:

It is to be understood that the portion of the diagram shown at the left of the break presents operative means located at the receiving station, while the portion to the right of the break indicates the "at will" operating means located at the transmitting station. It will be noted that the diagram presents the means of the transmitting station with the exception of line 37a as tapping lines instead of providing end zones of such lines. This showing is designed to show an installation involving a plurality of tanks capable of being individually tested as to content depth from the same receiving station. In such individual tests, the means shown at the right is duplicated at each tank to provide transmission from the tanks individually, each tank having a line, indicated at 37b, 37c, 37d, 37e, etc., each being similar to line 37a, connecting the tank means with a switching means 49, having a connection line 37 and arranged to connect either of lines 37a, 37b, etc., in circuit with line 37 at will, thus placing the transmission assembly of the individual tank selectively in circuit with the receiving station for individual test of the tank. Where the installation includes a single tank, the switch means 49 may be omitted and line 37a connected direct to line 37, with the complemental line 38 connected to the single transmitting station. In the following description of Figure 6, the plurality of tanks are assumed to be present.

The power source is not shown, but is assumed to have a pair of lines, one of which is line 38, and the other indicated at 50, these leading primarily to the receiving station, where line 50 leads to a circuit make and break unit 51, adapted to place line 50 in communication with line 37 by unit operation to complete the circuit. Unit 51 is active during both stages of the testing operation. When the circuit is closed at this point, it includes switch 49, at which it is assumed that line 37a is being used for the test. Line 37 has a permanent connection with the selsyn unit 33 at the receiving station through line 52 leading to the exciter 53 of selsyn unit 33, the exciter having connection with line 38, as does the selsyn unit, line 38 forming the common return for the selsyn unit and its exciter 53. Line 37 also is connected with the selsyn unit exciter 54 of the transmission station through line 37a, this exciter also having connection to line 38 through a continuation 38a of such line, selsyn unit 31 also having a connection with line 38a. These circuits supply current to the selsyn units, the latter being connected electrically through lines 35 and 36 and having a common return through lines 38 and 38a, as previously pointed out.

As before noted, the selsyn unit 31 is driven by a motor 32, this motor being operatively connected with line 37a through a line 55 leading to the motor, the latter line including a two-position reversing unit 56 which, in one position sends the current through the motor in one direction and in the second position sends the current in the reverse direction through the motor, these positions alternating as presently described. Since the two stages form the complete testing cycle, unit 56 is always in the same position at the close of the cycle, this position, in practice, serving to operate the motor clockwise when the circuit is active, it being preferred, but not compulsory, to have clockwise operation of the motor during the first stage of the test cycle. The return circuit for the motor operation leads from unit 56 to a connection 58 with line 38a, the latter also forming the common return for selsyn unit 31 and its exciter 54, and forms a similar return connection for a pair of relays now to be referred to.

The circuits thus referred to remain active during the first stage of the cycle with the motor and the two selsyn units rotating clockwise, thus advancing vane 39 in the clockwise direction. As previously stated, this movement of the vane continues until one of the ends of the vane contacts finger 29a. The resultant effect is to provide a strong resistance to the further advance of the vane in this direction and thereby stop further rotation of the selsyn units, but without affecting the continued rotation of the motor in such direction, spring belt drive 44 permitting slippage between the motor and selsyn unit 31. Stop of the selsyn units is indicated at the receiving station by stopping the advance of hand 48, the position of which relative to scale 17a is then noted, thus closing this stage. If desired, the circuits may now be broken by opening the circuit at unit 51, but such action is not compulsory and, in fact, it is preferred to maintain the circuit, relying on the slippage of drive belt 44, to enable rapid opening of the second stage of the cycle to obtain the inch scale indication.

59 indicates a line connected parallel with line 37 and which includes a hand-operated push button switch 60 to control the activity of line 59. During the first stage of the cycle switch 60 is in open position so that line 59 is inactive. Line 59 extends to a contact of selector relay unit 61, presently described, and then passes to a reversing relay 62 forming part of unit 56, activity of the relay serving to shift the unit 56 to an opposite position while the relay is active, the line through the relay having a connection with line 58 leading to the common return 38. When switch 60 is closed this line 59 becomes active and renders relay 62 active to draw the movable member of reversing unit 56 to shift such member to close circuit connections in a manner to reverse the current flow through motor 32, the return flow, in each instance, being through line 57 en route to line 38a, unit 56 shifting its contact members in such manner that the current will flow to the motor from line 37a and from the motor to line 38a in both stages of the cycle, activity of relay 62 during the second stage changing the direction of flow through the motor.

The reversal of the direction of rotation of the motor and of the selsyn units serves to reverse the direction of advance of vane 39, thus causing the end zone of the vane to retreat freely from its contact with finger 29a. During the retreating movement the angular end zones of the vane are moved through the oil in such manner that the vane end zone which had been raised during the previous advance of the vane is now moved downward while the opposite end zone is raised. Hence, in this second stage the rotation of the vane does not again bring the vane into contact with finger 29a. However, the opposite vane end is now raised by the reverse movement and can therefore approach and contact finger 30a, thus stopping the advance of the selsyn units, as previously stated, and placing hand 48 in its indicating position on scale 16a, permitting notation of the position of inch hand 19. The control elements 51 and 60 remain active in this second stage until the vane contacts finger 30a, stopping the selsyn units, after which the elements are permitted to open the circuits controlled by each, thereby stopping operation of the "at will" portion of the system, the continuously active portion of the system not being affected by such stoppage.

While the assemblage may be used where a single tank is in service, it also is usable where a number of individual tanks form a group at an oil field or distributing station, with a single receiving station serving the tanks. It is such a system that is diagrammatically illustrated in Figure 6 wherein, for purposes of illustration, five tanks are shown, each of which is adapted to be selectively and individually connected with the receiving station for the purpose of obtaining depth content data. After completion of the several tests, the data of the individual tests is assembled for a simple mathematical treatment to obtain total current volume content of the group of tanks in terms of gallons or the like, since it would be difficult to construct the several tanks with exactly the same surface area.

While the diagram roughly illustrates the different installations used in the transmission and receiving stations, with the former shown at the right end of the diagram and the latter at the left end and with the division between them shown by the break in continuity of lines, certain conditions present in the regimen set up certain problems requiring solution in order that the succession of tests covering the entire range of tanks may be capable of developing similar test regimens. A few of these conditions are now referred to.

While the test regimens each involve the use of a two-unit selsyn assembly, the invention contemplates the use of a unit of the type indicated at 31 for each tank to provide a transmission station for the individual tank, while only one unit of the type indicated at 33 is used, this being located at the receiving station. The transmission assembly is duplicated at each tank and is brought into cooperative relationship with the assembly of the receiving station at will, being inactive except during testing of a particular tank. Thus, it is necessary to provide means for selecting and automatically isolating individual transmission assemblies during the period of a test, and to render the regimen and its development more or less automatic in nature.

The switching means 49 previously referred to is the primary element in this respect, since it enables selection at will between certain lines individual to a transmission station, these lines being 37a, 37b, 37c, 37d, etc., with each, like line 37a, extending to the transmission station of an individual tank, so that by adjusting means 49 to an individual line, the tank to be tested is selected.

However, lines 35, 36, 38a and 59 must also be established before the regimen can be developed and this is done automatically, after the tank station has been selected, in the following manner:

While lines 37a, 37b, 37c, etc., are individual to a tank and responsible for development of the regimen individually at any transmission station, lines 35, 36 and 59 are common to all tank stations, being a continuous line which reaches to all transmission stations. Each transmission station has its individual lines bearing these numbers permanently tapping the common lines referred to. Hence, if these station lines are rendered active at any station, such activity will open communication between the transmission and receiving stations through such lines. To provide such activity and inactivity is the function of selector relay 61, a unit designed to make and break each of these lines within the assembly at the transmission station. Line 38a is also a line common to all tank stations, but the connection to this line is not broken at any time, it being the service return line so that its activity depends upon concurrent activity of lines 37a, 37b, 37c, etc., which are individual to a particular tank. Relay 61 is therefore active only with lines 35, 36 and 59 and their branches 35a, 36a, and 59a, and only in co-operation with lines 37a, 37b, 37c, etc., as presently explained.

Selector relay 61 is a two-member unit, one of the members of which, 64, is a circuit make and break structure mounted within lines 35a, 36a and 59a, these lines each having a gap, the opening and closing of which is controlled by this unit, the gaps being normally open and adapted to be closed concurrently by movement of member 64. The second member 65 of the unit is shown diagrammatically as a solenoid magnet and shown as connected to line 37a parallel with exciter 54. Whenever line 37a is active, member 65 also becomes active and remains active as long as 37a is active. When member 65 is made active it operates to shift member 64 to concurrently close the gaps in lines 35a, 36a and 59a, thus preparing these lines for activity within the regimen above pointed out. One of these relays 61 is present within the transmission station of each of the tanks. Where only one tank is present in the installation, relay 61 and means 49 may be omitted, since there is no need for selection of tanks for testing.

While the unit 61 is referred to as a "selector relay," the term does not accurately describe its service in the assembly, the actual selection of the tank to be tested being made at the switch means 49 at the receiving station and which is designed to render a particular line of the series 37a, 37b, 37c, etc individually active to the selected tank transmission station, and since each transmission station also including other lines, such as lines 35a, 36a and 59a, it is necessary to make these lines active only by closing the normally open gaps in these lines at the selected station. That is the function of the selector relay of the selected station, and is needed where the installation contains more than one tank, owing to the particular arrangement of circuits 35, 36 and 59.

For simplification of the system and to render its installation less costly, the latter lines to each of the transmission stations are common to all these stations, lines 35a, 36a and 59a tapping these lines at each station. To prevent activity of the latter at all stations except the selected one, the lines 37a, 37b, 37c, etc., are made individual to different stations, making it possible to select the tank to be tested by switching means 49. The transmission stations at the several tanks are duplicates, each carrying selsyn unit 31 and its drive motor 32, while but one selsyn unit 33 is used, it being at the receiving station, making it necessary to connect but one of units 31 to unit 32 at a time to avoid confusion, the reason for the gaps in lines 35a and 36a. With line 59 also a common line, a gap in line 59a must be provided at each transmission station so that when switch 60 is closed it will be made active only at the selected station. By normally retaining these three gaps open at all transmission stations it is possible to complete the selection by first selecting the particular tank to be tested by manipulating switching means 49 at the receiving station and then completing the selection by automatically closing these gaps at the selected station through activity of relay 61 at such station.

A number of advantages are presented by this system. For instance, since each tank is tested individually, the installation may include any number of tanks. Additional tanks can be added to the system with each having its individual transmission station by having its individual feed line connected with an individual contact of selection switch 49 and extending lines 35, 36, 38 and 59 to the added stations and connecting the added transmission equipment thereto. Additional tankage of a growing installation can be added to the system at minimum cost additional to cost of transmitting station equipment.

Due to the fact that the selsyn assembly is of two-unit type capable of rotating in either direction, the system can operate with a single receiving station with single selsyn unit, thus limiting the cost of selsyn equipment correspondingly.

The use of individual scales for feet and inch values, made possible by reversibility of selsyn assembly, enables the use of compact transmitting station equipment without loss of reading accuracy. The large dimensions of tanks makes it important to secure accurate depth readings even to fractions of an inch, a condition which would require a single scale to be of prohibitive dimensions. By use of reduction gearing driven by the shaft carrying the inch indicating hand, the hands of both scales have concurrent movement as to time and direction so that whether the content is increased or diminished, with resultant rise or fall of surface level, the current position of the latter is always presented on the scales at the tank, and can be quickly indicated at will on the scales at the receiving station. Since the system provides the reading for feet values during the first stage and inch values second, accurate reading is had due to the fact that the testing is based on the time the vane contacts the finger. Hence, although the cycle includes two stages, increasing the length of time for completing the test, the increased time will not vary the result since the total time required is materially less than that required to change the surface level sufficient to raise or lower the level the distance of one foot, and the first reading of the foot scale will not affect the accuracy of the reading of the inch scale, the two readings being an accurate presentation of current depth value of the tank.

While there is herein shown and described the preferred embodiment of the invention, it is nevertheless to be understood that minor changes may be made therein without departing from the spirit and scope of the invention as claimed.

What is claimed as new is:

1. For service in systems for ascertaining the depth value of the content of a tank or the like and for transmitting at will indications of such depth value to a receiving station remote from the transmitting station, and in combination, a tank the depth value of which is to be ascertained and transmitted to the receiving station, said tank having a transmitting station with the latter including an instrumentality rendered active by a float movable with the surface level of the tank content, said instrumentality including a pair of indicating hands pivotally movable on a common axis relative to each other and to a pair of scales individual to the hands and calibrated respectively in terms of feet and inches, said instrumentality also having a pair of arms each bearing a finger and movable respectively in unison with the pair of indicating hands, a transmitting assemblage connecting the transmitting and receiving stations with some of the assemblage elements located at one station and other elements at the other station and operative electrical connections therebetween, said assemblage including a motor-driven selsyn assembly of two-unit type with each unit located at a different station and with a motor of the selsyn assembly located at each station, control means located at the receiving station for rendering the selsyn assembly active at will, said means being operative to selectively control the direction of drive of the motor first in one direction of rotation and then in the opposite direction to complete the transmitting cycle, motor-driven mechanism rendered active by and in mechanically linked cooperation with selsyn unit operation at the transmitting station and rotatable with the selsyn unit for ascertaining the positions of the fingered arms relative to each other individually and by unit movements in opposite directions during the testing cycle to thereby ascertain the positions of the indicating hands of the instrumentality individually and in succession relative to its scale during the test, a pair of scales at the receiving station, and a single indicating hand at the latter station and movable in unison with the selsyn unit at such station, said hand co-operating with the two scales successively by the opposite rotations of the receiving station selsyn unit to thereby provide data for indicating the relative positions of the hands of the instrumentality at the transmitting station during the testing cycle of such station.

2. A system as in claim 1 characterized in that the instrumentality includes a drive and a driven shaft operatively connected with a 1:1 drive relationship, the driven shaft having one end zone carrying the inch indicating hand with the opposite end zone carrying the inch fingered arm, the shaft also carrying a pinion in the mid zone of its length and carrying a loose sleeve on each side of the pinion, with each sleeve carrying a gear, one of said sleeves carrying the foot indicating hand in one end zone of the sleeve, the other sleeve carrying the foot position indicating fingered arm in one end zone of such sleeve length, and speed-reduction gearing between said pinion and the sleeve gears for driving the sleeves at a predetermined reduced speed ratio value.

3. A system as in claim 2 characterized in that inch and foot scales are arranged in concentric relation and spaced apart with the inch scale outermost and calibrated to present a peripheral length equal to one foot in length to thereby cause one complete revolution of the inch indicator hand to equal a distance of one foot in the rise and fall of the surface level of the tank, the peripheral length of the inch scale being such as to permit calibration thereof into minor divisions at least as small as one-sixteenth inch, and further characterized in that the inner scale is calibrated into a number of divisions at least equal to the contemplated number of feet within the maximum depth value of the tank content, the reduction gear ratio between the drive shaft and the sleeves carried thereby being at least equal to the number of feet comprised in the maximum depth value, whereby the foot scale calibration will present few or no subdivisions, the combined scales at the close of the testing period presenting the actual depth of the content, with the inner foot scale indicating the number of complete feet within the actual depth and the outer inch scale presenting any additional depth above that indicated by the foot scale.

4. A system as in claim 3 characterized in that the instrumentality scales are co-operative with individual indicating hands, while the receiving station scales co-operate with a single indicating hand with the latter movable in each of the two stages of the testing regimen, the reading notation for the first stage being the position of the hand relative to the inner scale to indicate foot value and the reading notation of the second stage being the position of the hand relative to the outer scale to indicate the additional inch value.

5. A system as in claim 1 characterized in that the system includes a main operating circuit of feed line and return characteristic with the current supply from a source of supply and the return to such source provided at the receiving station, said feed line including a manual make and break device at such station to render such main circuit active and inactive at will, said feed line leading to the exciter of the selsyn unit of the transmitting station and thence to the exciter of the motor, said feed line also having a branch leading to the exciter of the selsyn unit of the receiving station, the exciters of the selsyn units having connections in parallel with the return line, the exciter for the motor having connection with the return line through a reversing relay operative normally to lead the current through the motor in predetermined direction then by relay activity reversing the current path through the motor while retaining the normal activity of the remainder of the circuit.

6. A system as in claim 5 characterized in that the circuit assembly includes an additional line extending from the feed line at the receiving station to the reversing relay and in parallel relation with the feed line and operatively connected with the return line beyond such relay, said additional line including a manually-operated make and break device at the receiving station with the device open normally and during the first stage of the system cycle to thereby retain such line inactive, said device being manually maintained in closed position during the second stage of the cycle, said additional line when active being operative to energize a solenoid magnet of the reversing relay to thereby reverse connections of the feed line and return line to and from the motor to thereby reverse the current flow path through the motor to provide the second stage of the cycle.

7. A system as in claim 6 characterized in that the reversing relay includes a pair of gaps within the current paths through the motor, each gap having a pair of contacts with one contact of each pair operatively connected with the motor and the other contact of each pair operatively connectible with the circuit feed line or the circuit return line, and a shiftable element having members extending into both gaps and operative to selectively render one of the contacts of a pair active and the other inactive in either extreme of its shifting movement, said element being normally positioned to cause current flow through the motor for first stage operation of the motor with the element temporarily shiftable during activity of the additional line to cause current flow through the motor in the opposite direction to thereby reverse the motor operation for second stage operation of the motor.

8. A system as in claim 1 characterized in that the arms of the instrumentality are mounted on a common axis within a liquid pool and spaced apart in the direction of length of such axis with the arms extending radially relative to such axis and movable in such pool relative to each other about such axis, each arm having its finger extending downward with the fingers positioned on the respective arms and spaced different distances from the axis to thereby cause the arms to travel within the pool in individual concentric circular paths.

9. A system as in claim 8 characterized in that the selsyn unit of the transmitting station includes a vane element carried by and rotatable with the unit, said element being mounted within the pool and pivoted on a transverse axis within the mid zone of the vane length with the pivot intersecting the axis of rotation of the unit to thereby permit rocking of the end zones of the element on such transverse axis, said vane having end zone configurations shaped to cause raising of one end zone and lowering of the other during rotation of the unit in one direction and to rock the vane element on its transverse pivot axis to its opposite extreme to reverse the raised and lowered positions of the end zones during and by rotation in the opposite direction.

10. A system as in claim 9 characterized in that the configurations of the respective end zones of the vane element include parallel planar faces within the zone extending angular to the direction of length of both the unit axis and the axis of the transverse pivot of the vane to thereby produce rocking movement of the vane by the movement of the vane through the liquid pool, each end zone also having its upper edge face formed with a recessed zone with the recess of one zone positioned a radial distance from the unit axis of rotation similar to that of the finger of one arm, the position distance of the recess of the opposite end zone being similar to that of the finger of the second arm of the instrumentality, whereby the raised end zone of the vane will contact one of the arm fingers during rotation of the vane in one direction and escape the finger of the other arm, the opposite end zone being raised during unit movement in the opposite direction to cause contact of such end zone with the previously escaped finger and escape from the previously engaged finger.

11. A system as in claim 1 characterized in that the drive of the selsyn unit of the transmitting station by its motor is by a belt connection of a type to permit slippage of the belt in presence of material resistance to advance of the selsyn unit during either stage of the cycle to thereby prevent selsyn advance during such contact while permitting continuing motor advance during the stage.

12. A system as in claim 11 characterized in that the system includes a motor-reversing relay normally operative to produce motor operation in predetermined direction during the first stage of the cycle, the system being further characterized by a normally inactive circuit including such relay with the circuit rendered active by manual control and operative to temporarily reverse the circuits through the motor by relay activity during such manual control activity to thereby develop the second stage operation of the cycle.

13. In systems for ascertaining the liquid content of the depth value of tanks or the like and for transmitting at will such depth value data from a tank transmitting station to a receiving station remote from the transmitting station, and wherein the system installation includes a plurality of individual tanks having transmitting stations individual to the tank and a receiving station common to all of the tanks, the depth value indications of the respective transmitting stations being transmitted to the receiving station from each tank individually and at will, a system installation of such type having each of the tanks equipped with a constantly-active float-controlled instrumentality with the float supported by and movable with the surface level of the liquid content of the tank, each instrumentality including a pair of indicating hands and an individual calibrated scale for each hand, the calibrations of one scale being in terms of feet and the other in terms of inches, the instrumentality also including mechanism for moving the hands in accordance with the rise and fall of the float to indicate the depth in feet of the content on one scale and any additional depth in inches on the other scale, to thereby indicate the current depth value of the tank content at all times, the instrumentality further including an additional position-indicating arm for each hand, each arm being movable rotatively in unison with its hand, mechanism at each tank transmitting station for transmitting the current depth value positions of the hands of the instrumentality of a selected tank to indicating means at the receiving station with the latter including a pair of scales calibrated to duplicate those of the tanks, said mechanism including a selsyn unit at the receiving station and a complemental motor-driven selsyn unit for and individual to the several tank transmitting stations with each motor-driven unit adapted for electrical association with the unit of the receiving station at will to form a selsyn assembly of the two-unit type with each such selsyn assembly operative in either direction of rotation at will to thereby provide a two-stage cycle of operation of the assembly at will, the units of such selsyn assembly being individual and having their operating electrical connections normally broken between units during non-testing periods, and manually controlled means for operatively connecting the selected transmitting station unit to the unit of the receiving station during the testing period to thereby permit testing of the tanks individually.

14. A system as in claim 13 characterized in that the system when in testing service presents a feed line leading from a source of current supply to the receiving station en route to the selsyn unit of the transmitting station and its motor and controlling devices, said feed line having a branch feed line leading to the selsyn unit of the receiving station with such feed lines controlled as to activity by a manually-controlled switch at the latter station, a return line leading to such a source to which the elements fed from the feed line are connected to thereby complete circuits through such elements for activity during the first stage of the cycle of operation with the system also presenting an additional manually-controlled line inactive during the first stage and rendered active manually during the second stage of the cycle, said line leading to a reversing relay operative in controlling the direction of current flow through the selsyn motor at the transmitting station with such additional line also connected with such return line, the system also presenting lines connecting the pair of selsyn units forming the active selsyn assembly.

15. A system as in claim 14 characterized in that the system includes a selection switch for feed line service with the switch located at the receiving station, said switch having a plurality of individual contacts equal in number to the number of tanks in the installation, with each contact having a line leading direct to the transmitting station of an individual tank to form the feed line for that tank, the switch having permanent connection with the controlled feed line at the receiving station and having means for connecting such controlled feed line to either of the switch contacts to thereby selectively complete the feed line to a selected tank transmitting station.

16. A system as in claim 15 characterized in that the return line extends to each of the transmitting stations in common being tapped by the return line of such stations individually to thereby complete the feed circuit of the transmitting station selected by the selection switch with the remainder of the transmitting stations inactive due to the absence of an active feed line thereto.

17. A system as in claim 16 characterized in that the additional line to the reversing relay and the lines for connecting the pair of selsyn units constituting a selsyn assembly each extends to each of the transmitting stations in common, each being tapped by the corresponding branch lines of such stations individually, such branch lines of a station including a selection relay active on each of such branch lines of a station concurrently, the selection relay of each station being normally in circuit break position and automatically movable to circuit make position solely by and during the activity of the feed line of the station to thereby limit the activity of such lines to the station selected at the selection switch and render the selected station co-operative with the receiving station in providing the depth value indications of the selected tank.

LEE ELMER THOMPSON.

REFERENCES CITED

The following references are of record in the file of this patent:

UNITED STATES PATENTS

| Number | Name | Date |
|---|---|---|
| 1,866,902 | Overmire | July 12, 1932 |
| 1,927,337 | Cowan | Sept. 19, 1933 |
| 1,964,228 | Tanner | June 26, 1934 |
| 2,082,038 | West et al. | June 1, 1937 |
| 2,216,035 | Lang | Sept. 24, 1940 |
| 2,304,698 | Leathers | Dec. 8, 1942 |
| 2,321,971 | Becker | June 15, 1943 |
| 2,356,200 | Bedard | Aug. 22, 1944 |

FOREIGN PATENTS

| Number | Country | Date |
|---|---|---|
| 596,043 | France | July 31, 1925 |